April 14, 1953
G. W. KALLAL
2,634,578
DEVICE FOR VARYING THE EFFECTIVE AREA OF DISCHARGE
ORIFICES OF JET ENGINES OR AFTERBURNERS THEREFOR
Filed Feb. 19, 1949
2 SHEETS—SHEET 1
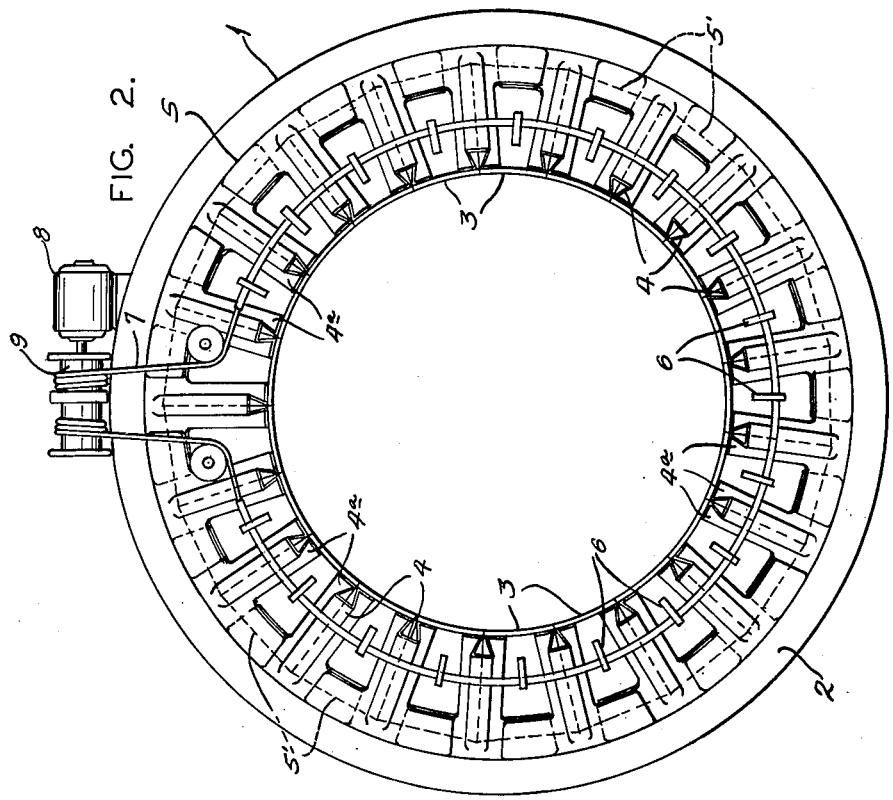
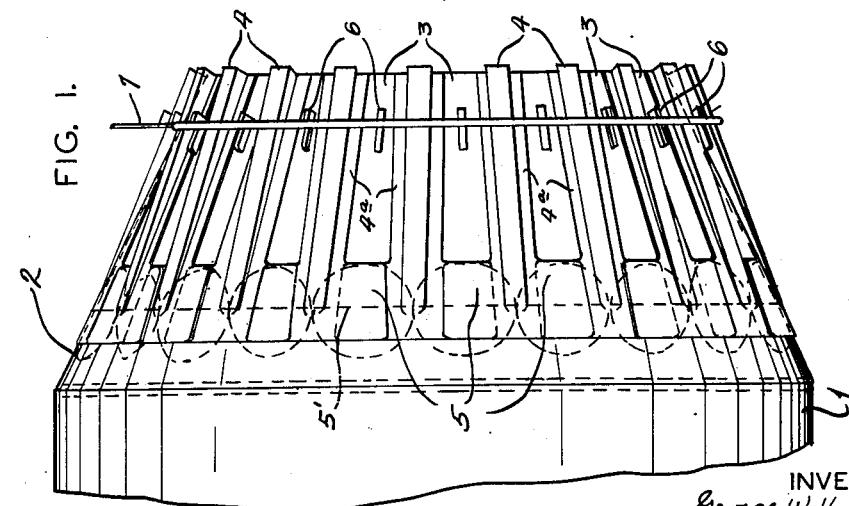
INVENTOR:
George W. Kallal,
By Carr & Carr & Gravely,
HIS ATTORNEYS.

April 14, 1953 G. W. KALLAL 2,634,578
DEVICE FOR VARYING THE EFFECTIVE AREA OF DISCHARGE
ORIFICES OF JET ENGINES OR AFTERBURNERS THEREFOR
Filed Feb. 19, 1949 2 SHEETS—SHEET 2
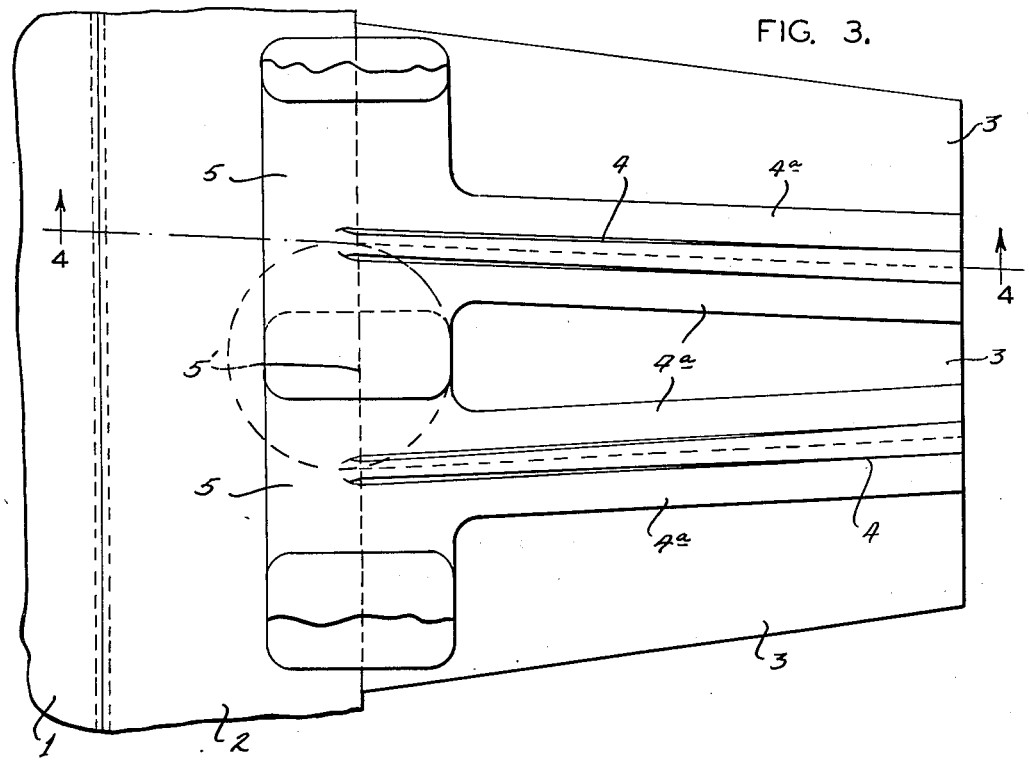
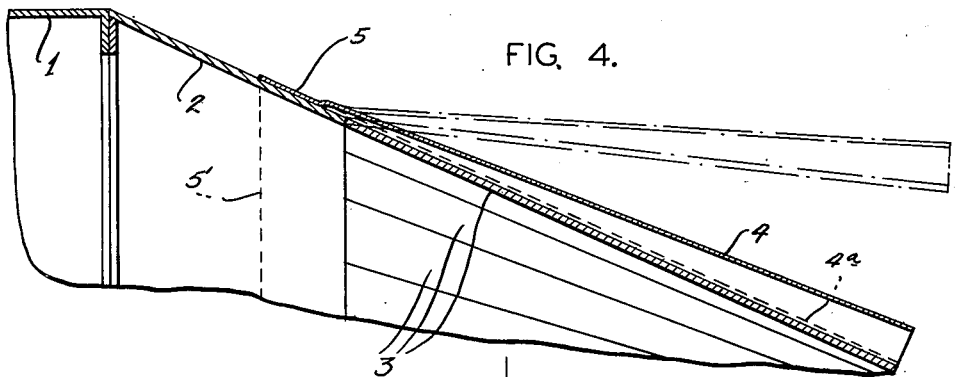
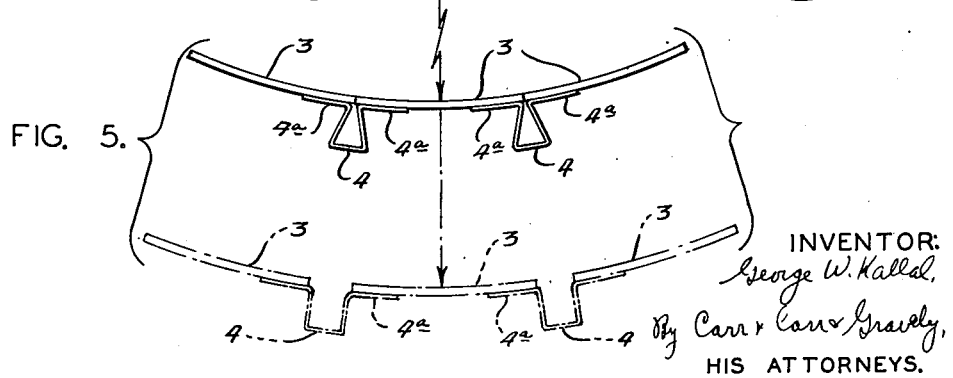
INVENTOR:
George W. Kallal.
By Carr & Carr & Gravely,
HIS ATTORNEYS.

Patented Apr. 14, 1953

2,634,578

UNITED STATES PATENT OFFICE 2,634,578

DEVICE FOR VARYING THE EFFECTIVE AREA OF DISCHARGE ORIFICES OF JET ENGINES OR AFTERBURNERS THEREFOR

George W. Kallal, Overland, Mo., assignor to McDonnell Aircraft Corporation, St. Louis, Mo., a corporation of Maryland Application February 19, 1949, Serial No. 77,352

10 Claims. (Cl. 60—35.6)

This invention relates to devices for varying the effective area of discharge orifices of jet engines or afterburners therefor.

The object of the invention is to provide a simple and economical, quickly attachable and detachable device that is readily adjustable to vary the effective area of the discharge orifice.

Another object of the invention is to prevent lateral leakage of high pressure gases from the discharge orifice control device in all positions of adjustment thereof.

The invention consists in providing a tubular member adapted for attachment to the discharge end of a turbo jet engine or afterburner therefor and comprising a plurality of longitudinally extended tapered segments or members mounted for joint movement radially of said member to vary the effective diameter of the discharge orifice of said engine or afterburner. The invention also consists in providing flexible connections between the wall segments for permitting adjustment thereof and for preventing leakage therebetween in all positions of adjustment. The invention also consists in hingedly mounting the flexible connections for swinging movement radially of the tubular orifice control member. The invention also consists in providing the device with means for limiting the outward movement of the wall forming sections thereof.

In the drawings:

Fig. 1 is a side elevational view of a device incorporating the invention, with certain parts omitted therefrom, Fig. 2 is an end view of the device illustrated in Fig. 1, Fig. 3 is an enlarged detail view of a portion of the expansible elements illustrated in Fig. 1, Fig. 4 is a sectional view taken substantially along the line 4—4 of Fig. 3 showing the expansible elements in contracted and expanded form; and Fig. 5 is an end view of the parts illustrated in Fig. 3 showing them in contracted and expanded form.

The device embodying this invention comprises an annular body member 1 that defines the discharge end of a turbo jet engine or afterburner. The control device comprises a tubular member securable to the body member, one portion being made up of a continuous ring or annulus 2 one end of which is secured to one end of member 1, and the other portion being made up of a plurality of tapered segmental members 3 so arranged that the larger end of each is positioned adjacent to the other end of the annulus 2. The end of the annulus 2 not secured to said body member defines the maximum discharge orifice area and the segmental members regulate the effective area varying it from maximum to a minimum.

The adjoining edges of each of the tapered members 3 are connected by means of an expansible resilient member 4 substantially triangular in section and whose edges 4a are laid upon and secured to the edges of tapered members 3. The section of the triangular portion of the tapered resilient member 4 is largest at the outer smaller end of the tapered members 3 and is the smallest at the larger end of the tapered members 3. The resilient member 4 is flared or enlarged as at 5, so that it can be welded or otherwise secured to the larger end of the tapered members as well as to the annulus 2. The enlarged portion 5 of the resilient member constitutes a hinged or pivoted connection between the tapered members and the annulus, and in order to provide additional strength, the adjacent enlargements overlap and are welded together to minimize the possibility of leakage as well as fracture of the enlargement 5.

The edge of the annulus abutting the larger end of each tapered member is formed in a straight line parallel to the end of each tapered member. This results in a plurality of straight hinge lines 5' extending from the center of one resilient member 4 to the next. The formation of the straight edges on the annulus 2 causes it to be indented, as outlined by dotted lines in Figs. 1 and 3, thus forming a plurality of flat surfaces to which the enlarged portions 5 are secured. These flat surfaces and straight edges facilitate the pivoting of the tapered members 3, thereby preventing undue stress of the flared portion 5 of the resilient member 4.

Gases issuing from member 1 pass outwardly through the contracted orifice formed by the tapered member 3 assembly and exert an outward force on each of the tapered members. In order to limit the outward movement of the connected tapered segmental members, each is provided with a right angle bracket 6, one arm of which projects outwardly with each of the brackets defining a holding means for a cable 7 that circumscribes the control device and limits the outward movement of the tapered segmental member assembly. In order to control the movement of the members, a regulating device is provided in the form of a reversible motor 8 equipped with a double drum 9 about which the ends of the cable 7 are wound in opposite directions. When the motor 8 is rotated in one direction, cable 7 will be released, thereby enabling the gases issuing from member 1 to expand the tapered segmental member assembly 4 from the full line position, as illustrated in Figs. 4 and 5, to the dotted line position shown in the same views, or in any intermediate position, depending upon the amount of cable that has been wound on drum 9. Since the thrust developed by a jet engine is in part controlled by the effective area of the discharge orifice, it is clear that when the ends of the tapered members 3 define an orifice of smaller area than that defined by the annulus 2, an effective area control has been provided in the above described structure, and by reason of the resilient members 4 connecting the adjoining tapered members 3, more complete control is provided by eliminating the lateral escape of gases between the several tapered members.

What I claim is:

1. A device for controlling the effective area of an exhaust orifice for an aircraft prime mover comprising a body member for the engine; an annulus secured to said body member for defining the exhaust orifice for the engine; a plurality of annularly arranged segmental members hinged to one end of said annulus for defining an exhaust orifice smaller than the orifice in said annulus; and tapered expansible means secured to adjoining segmental members for bridging the space and preventing leakage of gas between said members.

2. A device for controlling the effective area of an exhaust orifice for an aircraft prime mover comprising a body member for the engine; an annulus secured to said body member for defining the exhaust orifice for the engine; a plurality of annularly arranged members for defining an exhaust orifice smaller than the orifice in said annulus; means for hinging one end of said members to said annulus; and tapered expansible means secured to adjoining annularly arranged members for bridging the space and preventing leakage of gas between said members.

3. A device for controlling the effective area of an exhaust orifice for an aircraft prime mover comprising an annulus secured to the prime mover; a plurality of longitudinally extended members; means for hinging said members to one end of said annulus; expansible means secured to adjoining members for preventing leakage therebetween; and means for regulating the pivoting of said plurality of members relative to said annulus for varying the effective area of the prime mover exhaust orifice.

4. A device for controlling the effective area of an exhaust orifice for an aircraft prime mover comprising a body member for the engine; an annulus secured to said body member for defining the exhaust orifice for the engine; a plurality of annularly arranged members hinged to one end of said annulus for defining an exhaust orifice smaller than the orifice in said annulus; resilient expansible means secured to adjoining members for bridging the space and preventing leakage of gas between said members; and means circumscribing said annularly arranged members for controlling the effective area of the exhaust orifice for the engine.

5. A discharge orifice area control device for a jet engine comprising a body member for the engine; an annulus secured to said body member defining a discharge orifice for the engine; a plurality of tapered members whose largest ends are arranged about one end of said annulus; and an expansible member secured to adjacent edges of said tapered members for bridging the space and preventing leakage of gas between said tapered members, said expansible member being enlarged at one end and with the enlarged end secured to adjoining tapered members and to said annulus, the enlargement forming a hinge connection between each tapered member and said annulus.

6. A discharge orifice area control device for jet engines comprising a body member for the engine; an annulus secured to said body member and defining a discharge orifice for the engine; a plurality of tapered members whose largest ends are disposed adjacent to one end of said annulus and which are disposed about said end of said annulus; a longitudinally extended expansible flexible member having its edges secured to the edges of adjoining tapered members for preventing leakage of gas between said tapered members and being formed into a tapered triangular shape disposed over the edges so that when the edges of said tapered members abut each other they will define an orifice that is smaller than the orifice in said annulus, said tapered members being expansible to define a larger orifice; and enlargements on each end of each flexible member secured to the large end of said tapered member and to said annulus for forming a hinge between said annulus and a tapered member.

7. A device for controlling the area of a discharge orifice for a jet engine comprising a body member for the engine; an annulus secured to said body member and defining a discharge orifice for the engine exhaust gases; a plurality of longitudinally extended tapered members arranged about one end of said annulus, the larger end of each tapered member disposed adjacent to said end, the smaller ends of said tapered members, when disposed in longitudinally abutting relation, defining an orifice smaller in area than the orifice in said annular member; an expansible member connected across the space between adjoining tapered members for preventing leakage therebetween; and an enlargement on each expansible member secured to adjoining tapered members and to said annulus for forming a hinge between said members and said annulus, the gases passing through said annulus acting on each of the tapered members moving said members outwardly to increase the area of the orifice defined by said tapered members.

8. A device as defined in claim 7 which includes a cable for circumscribing said annularly arranged tapered members for regulating the size of the orifice defined thereby.

9. A device for regulating the area of a discharge orifice for a jet engine comprising an annular body member for the engine; an annulus secured to said body member and defining a discharge orifice for gases discharged from the engine; a plurality of longitudinally extended tapered members arranged about one end of said annulus, the larger end of each tapered member disposed adjacent to said end; an expansible member formed into a generally triangular shape between its edges disposed across the space between adjoining edges of said tapered members and secured to the tapered members along the edges thereof for preventing leakage therebetween, the area of said triangular shape decreasing as it approaches said annulus, thereby causing the smaller ends of said tapered members to define an orifice smaller in area than the orifice in said annulus; and an enlargement on one end of each expansible member secured to adjoining tapered members and to said annulus, the enlargements of adjoining expansible members overlapping and forming hinges between said tapered members and said annulus, the gases issuing from said annulus acting on said tapered members to enlarge the orifice defined thereby.

10. A device as defined in claim 9 which includes a cable surrounding the annularly arranged tapered members; and means for adjusting the length of said cable for regulating the area of the orifice defined by said tapered members.

GEORGE W. KALLAL.

References Cited in the file of this patent

UNITED STATES PATENTS

| Number | Name | Date |
|---|---|---|
| 68,712 | Crook | Sept. 10, 1867 |
| 157,526 | Leggett | Dec. 8, 1874 |
| 186,310 | Curtis | Jan. 16, 1877 |
| 1,120,535 | Pruden | Dec. 8, 1914 |
| 2,094,707 | Jones | Oct. 5, 1937 |
| 2,462,953 | Eaton et al. | Mar. 1, 1949 |